United States Patent
Wain

(10) Patent No.: US 10,479,347 B2
(45) Date of Patent: Nov. 19, 2019

(54) VEHICLE ELECTRICAL CIRCUIT PROTECTION

(71) Applicant: Jaguar Land Rover Limited, Whitley, Coventry, Warwickshire (GB)

(72) Inventor: Richard Wain, Leamington Spa (GB)

(73) Assignee: Jaguar Land Rover Limited, Whitley, Coventry (GB)

(*) Notice: Subject to any disclaimer, the term of this patent is extended or adjusted under 35 U.S.C. 154(b) by 0 days.

(21) Appl. No.: 15/526,608

(22) PCT Filed: Nov. 18, 2015

(86) PCT No.: PCT/EP2015/076981
§ 371 (c)(1),
(2) Date: May 12, 2017

(87) PCT Pub. No.: WO2016/083211
PCT Pub. Date: Jun. 2, 2016

(65) Prior Publication Data
US 2017/0355364 A1    Dec. 14, 2017

(30) Foreign Application Priority Data
Nov. 24, 2014    (GB) .................................... 1420825

(51) Int. Cl.
*B60W 20/15*    (2016.01)
*B60L 3/00*    (2019.01)
(Continued)

(52) U.S. Cl.
CPC .......... *B60W 20/15* (2016.01); *B60L 3/0046* (2013.01); *B60L 3/12* (2013.01); *B60W 10/26* (2013.01);
(Continued)

(58) Field of Classification Search
None
See application file for complete search history.

(56) References Cited

U.S. PATENT DOCUMENTS

2007/0205031 A1    9/2007    Ogata
2010/0305793 A1*   12/2010   Kidston .................. B60K 6/365
                                                           701/22
(Continued)

FOREIGN PATENT DOCUMENTS

JP    2005295697 A    10/2005
JP    2008211900 A    9/2008
JP    2009089535 A    4/2009

OTHER PUBLICATIONS

Combined Search and Examination Report for application No. GB1420825, dated May 27, 2015, 5 pages.
(Continued)

*Primary Examiner* — Lail A Kleinman
(74) *Attorney, Agent, or Firm* — Reising Ethington P.C.

(57) ABSTRACT

A method of protecting the high voltage DC bus of a hybrid vehicle as well as to a hybrid vehicle and controller configured to implement the method. The method involves detecting a plurality of requests to start the vehicle and, in response to at least the first request, precharging and energizing the high voltage DC bus without starting the engine. When one or more further requests are detected the engine is started and the high voltage DC bus is energized if each of the further requests is detected within a respective predetermined time interval from the preceding request. Starting the engine provides an audible feedback to the driver that the vehicle is ready for operation, thereby preventing overheating of the precharging circuit.

20 Claims, 2 Drawing Sheets

(51) Int. Cl.
*B60L 3/12* (2006.01)
*B60W 10/26* (2006.01)

(52) U.S. Cl.
CPC ....... *B60L 2240/54* (2013.01); *B60L 2250/00* (2013.01); *B60L 2250/10* (2013.01); *B60L 2250/16* (2013.01); *B60L 2270/20* (2013.01)

(56) References Cited

U.S. PATENT DOCUMENTS

| | | |
|---|---|---|
| 2011/0128662 A1 | 6/2011 | Kato et al. |
| 2014/0056438 A1* | 2/2014 | Baalu ................... B60Q 5/008 381/86 |
| 2015/0061376 A1* | 3/2015 | Hartl ..................... B60R 16/02 307/9.1 |

OTHER PUBLICATIONS

International Search Report for International application No. PCT/EP2015/076981, dated Feb. 8, 2016, 5 pages.
Written Opinion for International application No. PCT/EP2015/076981, dated Feb. 8, 2016, 6 pages.

* cited by examiner

VEHICLE ELECTRICAL CIRCUIT PROTECTION

TECHNICAL FIELD

The present disclosure relates to vehicle electrical circuit protection and particularly, but not exclusively, to a method, algorithm, computer program, and control system for protecting electrical circuits in a vehicle, and to a vehicle incorporating such a control system. Embodiments of the invention have advantageous use in electric and hybrid electric vehicles.

BACKGROUND OF THE INVENTION

Hybrid and electric vehicles generally incorporate contactors for selectively connecting high voltage cells to the high voltage DC bus of the vehicle. The high voltage DC bus typically includes significant resistance and capacitance, both in normal use and when it is inactive. When the vehicle is started prior to commencing a journey, the high voltage DC bus will normally be fully discharged resulting in a significant voltage difference across the contactors. Closing the contactors in the presence of such a voltage difference can cause arcing across the contactor blades. This will cause heating and wear and can result in the blades being welded together.

One solution for preventing this issue is to precharge the high voltage DC bus prior to closing the main contactors, for example using a separate circuit that incorporates a series resistor on initialization of the vehicle. However, the precharging sequence heats the resistor and can cause damage if carried out several times in a short period of time.

In an effort to mitigate resistor damage, repeated attempts to initialize the vehicle may be prohibited. This prohibition may, for example, be implemented after a predetermined number of attempts within a given period of time. However, preventing initialization of the vehicle's onboard systems can cause significant inconvenience to the driver.

It is therefore a first non-exclusive aim of the invention to mitigate this issue. It is a further, more general non-exclusive aim of the invention to provide an improved means of protecting or preventing damage to the electrical circuits of a vehicle.

SUMMARY OF THE INVENTION

Aspects of the present invention relate to methods, algorithms, computer programs, and control systems for protecting electrical circuits in electric and hybrid vehicles, and to vehicles incorporating such computer programs and/or control systems.

An aspect of the invention provides a method of protecting an electrical circuit of an electric or hybrid vehicle having an electrical circuit and, optionally, an internal combustion engine, the method comprising detecting a first request to start the vehicle and, in response thereto, energizing the electrical circuit, e.g. without starting the engine, detecting one or more further requests to start the vehicle and, if each of the one or more further requests is detected within a respective predetermined time interval from a preceding request, energizing the electrical circuit and either providing an audible indication to the driver that the vehicle has been started or starting the engine in response thereto.

The invention is based on the surprising realization by the applicants that starting the engine in response to two or more requests or attempts to initialize or start a hybrid vehicle will, in certain cases, prevent more attempts occurring.

More specifically, the applicants have observed that the advent of hybrid and electric vehicles can be challenging for experienced drivers who have grown accustomed to the characteristics of traditional vehicles powered by internal combustion engines (ICEs). In an ICE powered vehicle, the sounds and/or vibrations associated with the engine starting and settling at idle speed provides a subconscious indication to the driver that the vehicle is ready to be driven. In a hybrid vehicle, the engine is not started on initialization in many cases. Whilst not wishing to be bound by any particular theory, the applicants believe that the lack of engine noise results, in the case of certain drivers, in several attempts by the driver to start the vehicle.

Initialization feedback has, to date, been provided by prominent, deliberate or expansive visual displays which illustrate and/or describe the state of the vehicle's onboard systems. However, visual displays have become conventional in vehicles powered by internal combustion engines and such displays are initialized when the key is inserted into the ignition, but before the engine has started. It is believed that many drivers may therefore disregard subconsciously visual displays in vehicles. Starting the engine, or indeed providing any form of audible feedback to the driver, could in certain cases overcome such a subconscious disregard of visual feedback.

Another aspect of the invention provides a method of protecting an electrical circuit of an electric or hybrid vehicle, the method comprising detecting two or more, e.g. multiple or a plurality of, requests or attempts, e.g. consecutive requests or attempts, to initialize or start the vehicle within a predetermined period of time and/or each within one or more or a respective predetermined time intervals from a previous or preceding, e.g. the immediately previous or preceding, request or attempt and, in response thereto, providing an audible indication to the driver that the vehicle has been initialized or started and/or starting an engine of the vehicle, for example thereby to provide an indication, e.g. an audible indication, that the vehicle has been initialized or started or is ready commence a journey.

The audible indication may comprise a notification or an automated and/or oral statement and/or simulated engine noise or sound. Additionally or alternatively, for example in hybrid vehicles, the audible indication may be provided by starting an engine, e.g. an internal combustion engine, of the vehicle.

The method may comprise starting the engine or providing the audible indication before or after or subsequent to or simultaneously or together with initializing or energizing of an electrical circuit of the vehicle, for example in response to a second, third, fourth, fifth or later request or attempt to initialize or start the vehicle. In embodiments, the method comprises detecting a second, third, fourth, fifth or later request or attempt to initialize or start the vehicle and, in response to the detected request or attempt, starting the engine and initializing or energizing an electrical circuit of the vehicle.

The method may comprise detecting a second request or attempt, for example within a first predetermined time interval from the first request, e.g. and initializing or energizing the electrical circuit, e.g. without starting the engine, in response thereto. The method may comprise detecting a third request or attempt, for example within a second predetermined time interval from the first or second request, e.g. and initializing or energizing the electrical circuit, e.g. and starting the engine or without starting the engine, in response thereto. The method may comprise detecting a fourth or subsequent request or attempt, for example within a fourth or subsequent predetermined time interval from the first or second or third or subsequent request, e.g. and initializing or energizing the electrical circuit, e.g. and starting the engine or without starting the engine, in response thereto.

The method may comprise preventing the initialization or starting of the vehicle or the initializing or energizing of the electrical circuit after a predetermined number of requests or attempts, e.g. consecutive requests or attempts, for example three or four or five or more requests or attempts, e.g. within a predetermined period of time and/or each within one or more or a respective predetermined time intervals from a previous or preceding, e.g. the immediately previous or preceding, request or attempt. In embodiments, the method comprises preventing initialization or starting of the vehicle or electrical circuit where, e.g. only where, a predetermined number of successive or consecutive requests or attempts, for example three or four or five or more successive or consecutive requests or attempts, are detected or have occurred, e.g. each request or attempt having been detected within a predetermined time interval range or threshold, for example within 30 or 20 or 15 or 10 seconds, of the previous request or attempt. In embodiments, the predetermined time intervals are all the same. In embodiments, the predetermined time interval is different for at least one of the requests or attempts, for example the predetermined time interval between the first and second request or attempt might be different than the predetermined time interval between the second and third requests or attempts, e.g. one of the predetermined time intervals may be 20 seconds and the other may be 30 seconds or any other combination is also possible.

Initializing or energizing the electrical circuit of the vehicle may comprise closing one or more contactors, e.g. one or more main contactors, for example to connect an energy source, e.g. a battery which may comprise a high voltage battery, to the electrical circuit, which may a bus, e.g. a DC bus which may comprise a high voltage DC bus. Initializing or energizing the electrical circuit may comprise precharging the electrical circuit, for example before closing the one or more contactors or main contactors and/or using a precharging circuit that may include a contactor and/or a resistor, for example a series resistor. In embodiments, the precharging circuit bypasses one or more contactors or main contactors and/or includes a contactor and a resistor that may be connected in series, for example to precharge a capacitance of or in the electrical circuit. The method may comprise preventing the initialization or starting of the vehicle or the initializing or energizing of the electrical circuit when at least part of the electrical circuit, e.g. a precharge circuit or resistor thereof, reaches or exceeds a predetermined temperature or temperature threshold.

The request or attempt to initialize or start the vehicle may comprise receiving an input from a user or driver, for example via input means such as an ignition or ignition switch and/or button, which input may comprise insertion and/or rotation or turning of a key or other device and/or pressing the or a button, e.g. with the key or other device inserted into a receptacle or an ignition. Additionally or alternatively, the input from a user may comprise a command, for example an audible or verbal command, which may be receivable by the ignition. Additionally or alternatively, the input from a user may comprise capturing, or initiation of the capture of, one or more biometric parameters or biometric data, for example a fingerprint or iris scan. Operation of the ignition may generate or create or correspond to a start signal.

Another aspect of the invention provides a computer program element comprising computer readable program code means for causing a processor to execute a procedure to implement the aforementioned method. A further aspect of the invention provides the computer program element embodied on a computer readable medium.

Another aspect of the invention provides a computer readable medium having a program stored thereon, where the program is arranged to make a computer execute a procedure to implement the aforementioned method.

A further aspect of the invention provides a control means or control system or controller comprising the aforementioned computer program element or computer readable medium.

Another aspect of the invention provides a control system for an electric or hybrid vehicle, the system comprising a processor, an input means and an output means, wherein the system or processor is configured or programmed on receipt, in use, by the input means of two or more requests, e.g. consecutive requests, to initialize or start the vehicle within a predetermined period of time and/or each within one or more or a respective predetermined time intervals from a previous or preceding, e.g. the immediately previous or preceding, request to provide via the output means an audible indication to the driver that the vehicle has been initialized or started and/or to provide or send a signal via the output means to start an engine of the vehicle, for example thereby to provide an indication, e.g. an audible indication, that the vehicle has been initialized or started or is ready commence a journey.

For the avoidance of doubt, any of the features described herein apply equally to any aspect of the invention.

The output means may comprise or be operatively connected or connectable to an audible output means or device, such as an amplifier and/or speaker. The output means may be configured or operable to provide a notification or an automated and/or oral statement and/or simulated engine noise or sound. Additionally or alternatively, for example in hybrid vehicles, the system may be configured or programmed to provide via the output means a signal for causing or to cause the vehicle to start the or an engine thereof, for example an internal combustion engine thereof, e.g. for providing or thereby to provide the audible indication.

The system may be configured or programmed, e.g. in response to a request or attempt to initialize or start the vehicle, which may comprise a first, second, third, fourth, fifth or later request or attempt, to send or provide a signal via the output means to close a precharge contactor and/or to precharge an electrical circuit of the vehicle. The system may be configured or programmed, e.g. in response to a request or attempt to initialize or start the vehicle, which may comprise a first, second, third, fourth, fifth or later request or attempt, to send or provide a signal via the output means to close a contactor, e.g. a main contactor, and/or to initialize or energize an electrical circuit of the vehicle and/or to connect an energy source, e.g. a battery which may comprise a high voltage battery, to the or an electrical circuit of the vehicle, which may be a bus, e.g. a DC bus which may comprise a high voltage DC bus.

The system may be configured or programmed to provide the audible indication or provide or send the signal via the output means to start the engine together with, or subsequent to, the precharging and/or initializing or energizing of the electrical circuit of the vehicle, for example in response to a second, third, fourth, fifth or later request or attempt to initialize or start the vehicle. In embodiments, the system is configured or programmed, e.g. on receipt via the input means of a second, third, fourth, fifth or later request or attempt to initialize or start the vehicle, to provide the audible indication or provide or send the signal via the output means to start the engine and to precharge and/or initialize or energize the electrical circuit of the vehicle, e.g. simultaneously or substantially simultaneously or in sequence or series and/or before a subsequent request or attempt to initialize or start the vehicle is received via the input means.

In embodiments, the system comprises a precharging means, e.g. for selectively bypassing one or more contactors of the or an electrical circuit, which precharging means may be connected or connectable, for example operatively or electrically connected or connectable, to the or an electrical circuit of the vehicle in use. The precharging means may comprise a precharging circuit, which may comprise one or more contactors, e.g. precharging contactors, and/or one or more resistors, e.g. series resistors, for example to precharge the or an electrical circuit of the vehicle in use.

In embodiments, the system comprises one or more contactors, e.g. main contactors, which may be connected or connectable, for example operatively or electrically connected or connectable, to an energy source, e.g. a battery which may comprise a high voltage battery, and/or to an electrical circuit of the vehicle, which may a bus, e.g. a DC bus which may comprise a high voltage DC bus. The one or more contactors may be operable, in use, to selectively connect and/or disconnect the energy source to the electrical circuit. The system may comprise the energy source and/or the electrical circuit.

The system may be configured or programmed to prevent, e.g. selectively prevent, initialization or starting of the vehicle or electrical circuit, for example after a predetermined number of requests or attempts, e.g. consecutive requests or attempts, for example three or four or five or more requests or attempts, e.g. within a predetermined period of time and/or each within one or more or a respective predetermined time intervals from a previous or preceding, e.g. the immediately previous or preceding, request or attempt.

In embodiments, the system is configured or programmed to prevent initialization or starting of the vehicle or electrical circuit where, e.g. only where, a predetermined number of successive or consecutive requests or attempts, for example three or four or five or more successive or consecutive requests or attempts, are detected or have occurred, e.g. each request or attempt having been detected within a predetermined time interval range or threshold, for example within 30 or 20 or 15 or 10 seconds, of the previous request or attempt. In embodiments, the predetermined time intervals are all the same. In embodiments, the predetermined time interval is different for at least one of the requests or attempts, for example the predetermined time interval between the first and second request or attempt might be different than the predetermined time interval between the second and third requests or attempts, e.g. one of the predetermined time intervals may be 20 seconds and the other may be 30 seconds or any other combination is also possible.

Additionally or alternatively, the system may be configured to prevent the initialization or starting of the vehicle or the initializing or energizing of the electrical circuit if a temperature of the electrical circuit, e.g. a precharge circuit or resistor thereof, is measured that corresponds to or exceeds a predetermined temperature or temperature threshold.

The input means may comprise an input or ignition, for example an ignition switch and/or button, which may comprise a receptacle and/or may be operable to receive a key or fob or other device. At least a portion of the input or ignition may be rotatable, e.g. with the key or fob or other device received therein or received or inserted into the receptacle thereof, for example thereby to indicate a request or attempt to initialize or start the vehicle. Additionally or alternatively, the input means may comprise a receiving means or receiver, such as a wireless or radiofrequency or audible receiving means or receiver or microphone. Additionally or alternatively, the input means may comprise a biometric data capture means or reader, e.g. for receiving biometric information or data or parameters, such as a fingerprint or iris scan or image.

A yet further aspect of the invention provides a vehicle comprising a computer program element and/or computer readable medium and/or control means or control system or controller as described above and/or an electrical circuit. The vehicle may comprise an electrical vehicle. Alternatively, the vehicle may comprise a hybrid vehicle, which may include an engine, for example an internal combustion engine. The vehicle may comprise an ignition means or ignition.

A yet further aspect of the invention provides a vehicle comprising an electrical circuit, an ignition and a control system operatively connected to the electrical circuit and to the ignition, the control system being configured, in use, to energize the electrical circuit in response to a first start signal and/or one or more further start signals from the ignition.

In embodiments, the vehicle comprises an internal combustion engine and the control system is configured, in use, to energize the electrical circuit without starting the engine in response to the first start signal, but may be configured to start the engine and energize the electrical circuit in response to the one or more further start signals, for example if each of the one or more further signals is received within a respective predetermined time interval from a preceding start signal.

In embodiments, the vehicle comprises an audible output means or output, such as a speaker, for example wherein the control system is configured, in use, to energize the electrical circuit, e.g. without providing an audible indication via the output means or output, in response to the first start signal. The control system may be configured to energize the electrical circuit and to provide an audible indication to the driver that the vehicle has been started in response to the one or more further start signals, for example if each of the one or more further signals is received within a respective predetermined time interval from a preceding start signal. The vehicle may further comprise a temperature sensing means or sensor or thermocouple, e.g. for measuring the temperature of at least part of the electrical circuit or a precharge circuit or resistor, wherein the control system may be configured to prevent the initialization or starting of the vehicle or the initializing or energizing of the electrical circuit if a temperature of the electrical circuit, e.g. a precharge circuit or resistor thereof, is measured that corresponds to or exceeds a predetermined temperature or temperature threshold.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
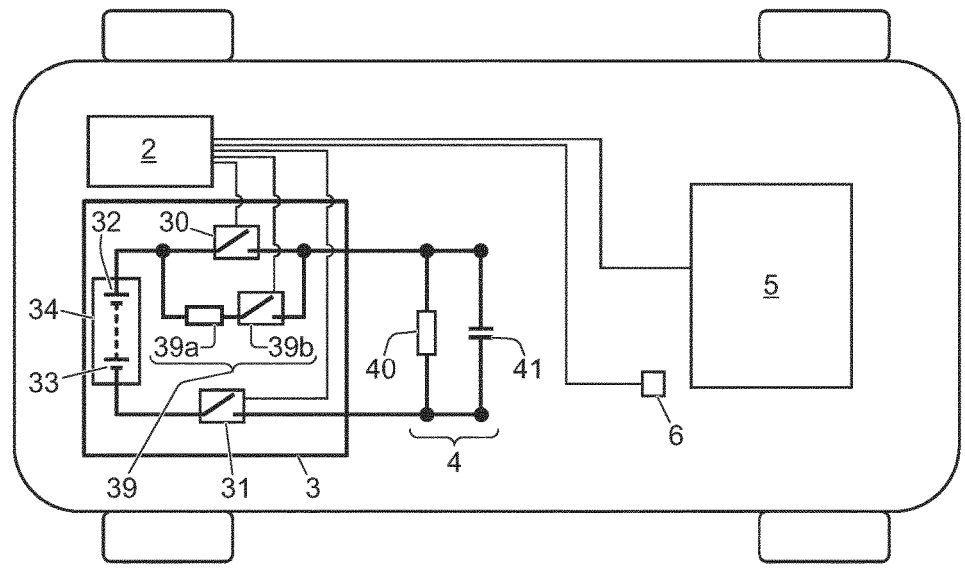
FIG. 1 is a schematic illustration of a hybrid electric vehicle according to an embodiment of the present invention.
Figure 2:
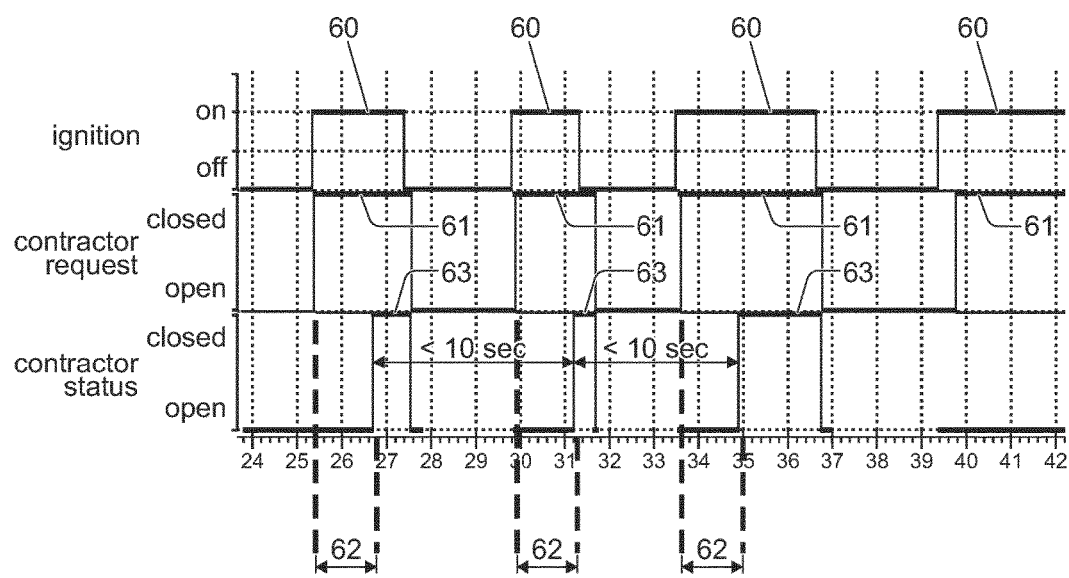
FIG. 2 is a graph illustrating an example of multiple consecutive requests to initialize the vehicle of FIG. 1.
Figure 3:
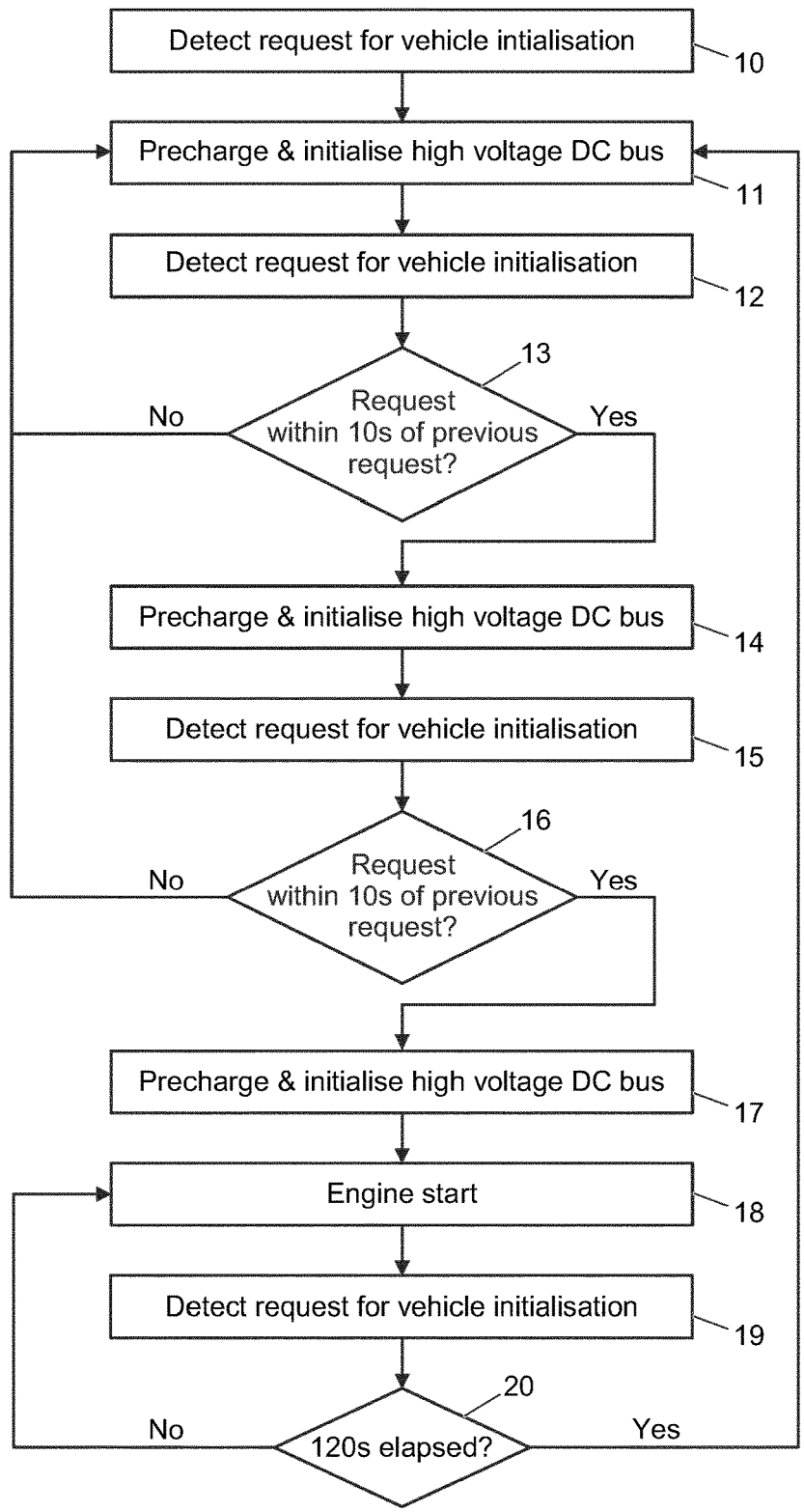
FIG. 3 is a flow chart illustrating the operation of the vehicle of FIG. 1 in accordance with the present invention.

A hybrid vehicle 1 in accordance with an embodiment of the present invention is described herein with reference to the accompanying FIGS. 1 to 3. With reference to FIG. 1, the vehicle 1 includes a controller 2, a battery control circuit 3, a high voltage DC bus 4, an internal combustion engine 5 and an input means 6.

The battery control circuit 3 includes two main contactors 30, 31 each of which is electrically connected to a respective terminal 32, 33 of a high voltage battery 34 and to the high voltage DC bus 4. The battery control circuit 3 also includes a precharge circuit 39 for bypassing the main contactor 30 connected to the positive terminal 32 of the battery 34. The precharge circuit 39 is connected in parallel to the main contactor 30 and includes a precharge resistor 39a and a precharge contactor 39b connected to one another in series.

The controller 2 is operatively connected to each of the main contactors 30, 31, the precharge contactor 39b and the engine 5 by respective cables. However, it will be appreciated that the actual physical connection between these components will not be as illustrated in FIG. 1; these are merely arranged in the manner shown for illustrative purposes.

The high voltage DC bus 4 includes components with inherent resistance and capacitance, which are depicted schematically by a resistor 40 and a capacitor 41 in FIG. 1. The input means 6 in this embodiment is the vehicle's ignition within which a driver inserts a key or key fob (not shown) and initializes or starts the vehicle 1 by turning the key or key fob or by pressing a button (not shown).

At initialization, it is necessary to close the main contactors 30, 31 in order to connect the battery 34 to the high voltage DC bus 4 of the vehicle 1. As explained above, it is likely that the high voltage DC bus 4 is fully discharged at this point, which results in a significant voltage difference across the contactors. Closing the contactors in the presence of such a voltage difference can cause arcing across the contactor blades, which would cause heating and wear or even the blades becoming welded together.

In order to avoid such issues, when the driver initializes or starts the vehicle 1 the main contactor 31 connected to the negative terminal 33 is closed, followed by the precharge contactor 39b, which charges the capacitance 41 of the high voltage DC bus 4 through the precharge resistor 39a. When the voltage across the high voltage DC bus 4 is substantially the same as the battery voltage, the main contactor 30 connected to the positive terminal 32 is closed and the precharge contactor 39b is opened, at which point the vehicle is ready for operation. Often, the engine 5 remains inactive at this point and so there is no audible indication that the vehicle has been initialized or started.

It has been observed that drivers often deactivate the vehicle 1, but then re-initialize or re-start the vehicle 1 shortly thereafter. It will be understood that the temperature of the precharge resistor 39a will have increased by virtue of the voltage applied to it during the precharge sequence. In order to prevent overheating, which could result from multiple consecutive attempts by the driver to initialize or start the vehicle 1, the controller 2 is programmed to prevent the re-energizing of the high voltage DC bus on detection of a predetermined number of requests or attempts to initialize or start within predetermined time intervals of each other.

In this embodiment and as illustrated in FIG. 2, operation 60 of the ignition 6 generates a contactor request signal 61, which initiates a precharge sequence 62 before the main contactor 30 connected to the positive terminal 32 closes 63 to energize the high voltage DC bus 4. If three consecutive precharge sequences 62 are detected in which each of the second and third sequences occurs within 10 seconds of the previous sequence, then the precharging operation is prevented.

In order to reduce the likelihood of multiple requests or attempts by the driver, which would result in such prevention of the precharge operation, the controller 2 is configured in this embodiment to start the engine 5 after the second request or attempt 60 in order to provide a more familiar indication to the driver that the vehicle 1 is initialized or started. The operation of the controller 2 is illustrated more clearly by the flow chart of FIG. 3.

Specifically, a driver (not shown) enters the vehicle 1, operates the ignition 6 which the controller 2 detects to be a request for vehicle initialization 10 and, in response thereto, the controller 2 precharges and energizes the high voltage DC bus 11. If the ignition 6 is subsequently switched off and the controller 2 detects another request for vehicle initialization 12, the controller 2 checks whether the request is within 10 seconds of the previous request 13. If the time interval is greater than 10 seconds, the request is considered to be a first request and the controller 2 precharges and energizes the high voltage DC bus 11. If the time interval is less than 10 seconds, the request is considered to be a second request and the controller 2 precharges and energizes the high voltage DC bus 14.

If the ignition 6 is again switched off and the controller 2 detects yet another request for vehicle initialization 15, the controller 2 checks whether the request is within 10 seconds of the previous request 16. If the time interval is greater than 10 seconds, the request is considered to be a first request and the controller 2 precharges and energizes the high voltage DC bus 11. If the time interval is less than 10 seconds, the request is considered to be a third request and the controller 2 precharges and energizes the high voltage DC bus 17.

In accordance with the invention, when a third request is detected the vehicle automatically sends an engine start signal 18 to cause the engine 5 to start, thereby providing a more familiar indication to the driver that the vehicle 1 is initialized or started. If subsequent attempts to operate the ignition 6 are detected 19, the controller 2 carries out a check 20 and blocks the energizing of the high voltage DC bus and simply starts the engine 5 until a time period of 120 seconds has elapsed.

It will be appreciated that the vehicle 1 and specific sequence of operation described above is but one illustrative embodiment. It would be readily understood that the threshold time interval need not be 10 seconds, the number of requests for initialization of the vehicle 10, 12, 15 prior to engine start 18 and/or lockout or prevention of the precharge sequence 11, 14, 17 may vary. For example, the engine start 18 may occur after detection of the second request for vehicle initialization 12 and/or the lockout or prevention of the precharge sequence 11, 14, 17 may occur after more or less than three requests 10, 12, 15.

It will further be appreciated that the configuration of the precharge circuit 39 and/or main contactors 30, 31 may vary without departing from the scope of the invention. Indeed, it is specifically envisaged that the present invention may be incorporated within an electric vehicle, for example an all electric vehicle. This might be done, for example, by providing an audible indication, such as an audible sound or statement broadcast to the driver indicating that the vehicle has been initialized. One possible audible indication may comprise, for example, a simulated engine noise, such as the sound of an internal combustion engine starting and/or idling.

It will be appreciated that various changes and modifications can be made to the present invention without departing from the scope of the present application.

The invention claimed is:

1. A method of protecting an electrical circuit of a hybrid vehicle having an electrical circuit and an internal combustion engine, the method comprising: detecting a first request to start the vehicle and, in response thereto, energising the electrical circuit without starting the engine, detecting one or more subsequent requests to start the vehicle and, if each of the one or more subsequent requests to start the vehicle is detected within a respective predetermined time interval from a preceding request, starting the engine in response thereto.

2. A method according to claim 1 comprising starting the engine before, after, or simultaneously with the energising of the electrical circuit.

3. A method according to claim 1 comprising detecting a second request to start the vehicle within a first predetermined time interval from the first request but not starting the engine in response thereto, wherein the second request is one of the one or more subsequent requests to start the vehicle.

4. A method according to claim 3 comprising detecting a third request to start the vehicle within a second predetermined time interval from the second request and, in response thereto, starting the engine, wherein the third request is one of the one or more subsequent requests to start the vehicle.

5. A method according to claim 4, wherein the first and second predetermined time intervals are the same amount of time.

6. A method according to claim 4, wherein the first and second predetermined time intervals are different.

7. A method according to claim 3 comprising detecting a third request to start the vehicle within a second predetermined time interval from the second request but not starting the engine in response thereto, wherein the third request is one of the one or more subsequent requests to start the vehicle.

8. A method according to claim 7 comprising detecting a fourth request to start the vehicle within a third predetermined time interval from the third request and, in response thereto, starting the engine, wherein the fourth request is one of the one or more subsequent requests to start the vehicle.

9. A method according to claim 1 comprising precharging the electrical circuit.

10. A method according to claim 1 comprising closing one or more contactors to energise the electrical circuit.

11. A method according to claim 1, wherein the electrical circuit comprises a high voltage DC bus.

12. A method of protecting an electrical circuit of a vehicle, the method comprising: detecting a first request to start the vehicle and, in response thereto, energising the electrical circuit, detecting one or more subsequent requests to start the vehicle and, if each of the one or more subsequent requests to start the vehicle is detected within a respective predetermined time interval from a preceding request, starting the vehicle and providing an audible indication to the driver that the vehicle has been started in response thereto.

13. A hybrid vehicle comprising: an electrical circuit, an internal combustion engine and a control system, the control system being configured, in use, to energise the electrical circuit without starting the engine in response to a first request to start the vehicle and to start the engine and in response to one or more subsequent requests to start the vehicle if each of the one or more subsequent requests to start the vehicle is detected within a respective predetermined time interval from a preceding request.

14. A vehicle according to claim 13 comprising one or more contactors for selectively connecting the electrical circuit to a battery of the vehicle.

15. A vehicle according to claim 14 comprising a precharging means for precharging the electrical circuit before closing the one or more main contactors.

16. A vehicle according to claim 15, wherein the precharging means comprises a precharging circuit for bypassing the one or more main contactors.

17. A vehicle according to claim 15, wherein the system is configured to prevent the electrical circuit from being energised after a predetermined number of requests to start the vehicle is received if each of the second and subsequent requests to start the vehicle is detected within a respective predetermined time interval from a preceding request.

18. A vehicle according to claim 13, wherein the electrical circuit comprises a high voltage DC bus.

19. A non-transitory computer readable medium having a program stored thereon, where the program is arranged to make a computer execute a procedure to implement a method according to claim 1.

20. A method as claimed in claim 12, wherein the respective predetermined time interval is a time interval that indicates the requests to start the vehicle are occurring too frequently and may cause overheating of the electrical circuit.

* * * * *